2 Sheets.
Sheet 1.
B. J. La Mothe.
Metallic R.R Car.
No 1,364.
Reissued Dec. 16. 1862.
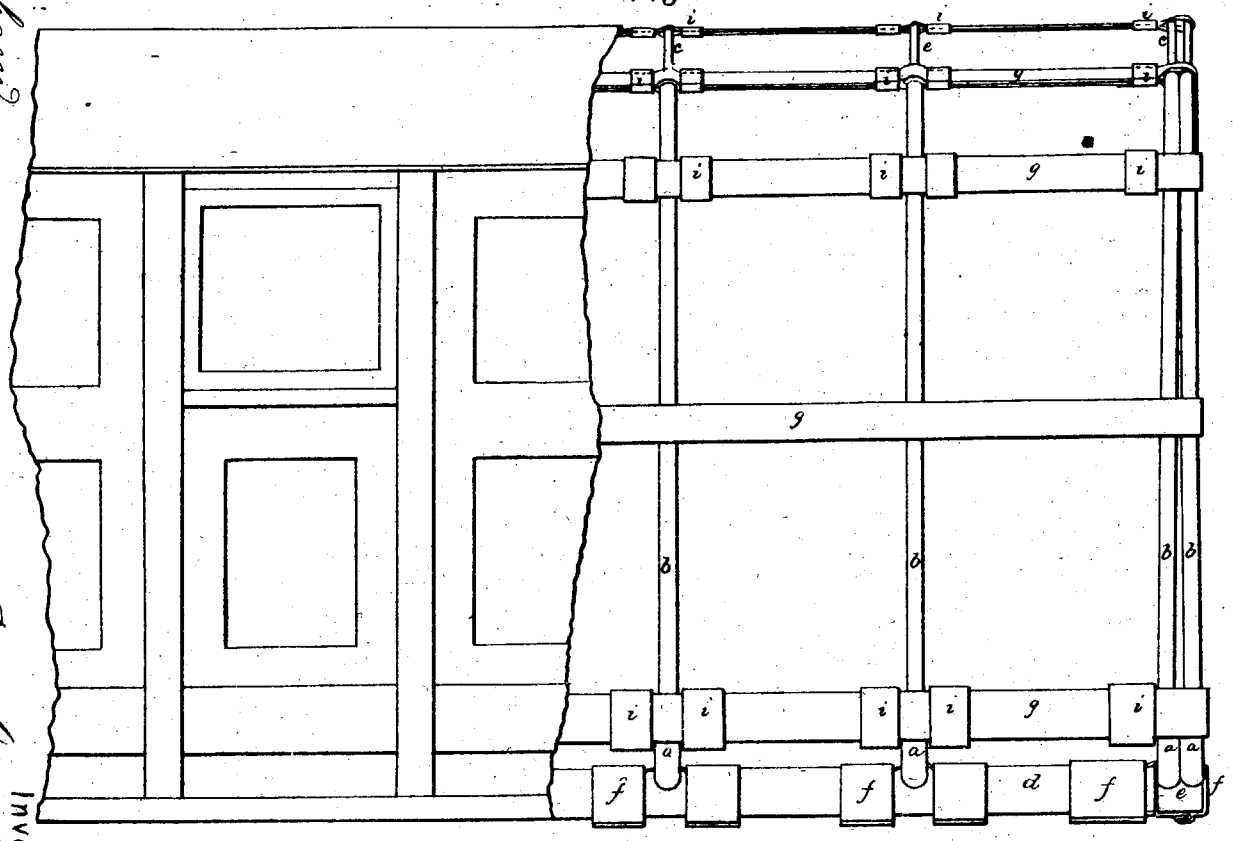
Witnesses:
S. Burnham
Wm Kemble Hall
Inventor:
B. J. La Mothe 2 Sheets.
Sheet 2.
B. J. La Mothe.
Metallic R.R Car.
No 1364.
Reissued Dec. 16. 1862.
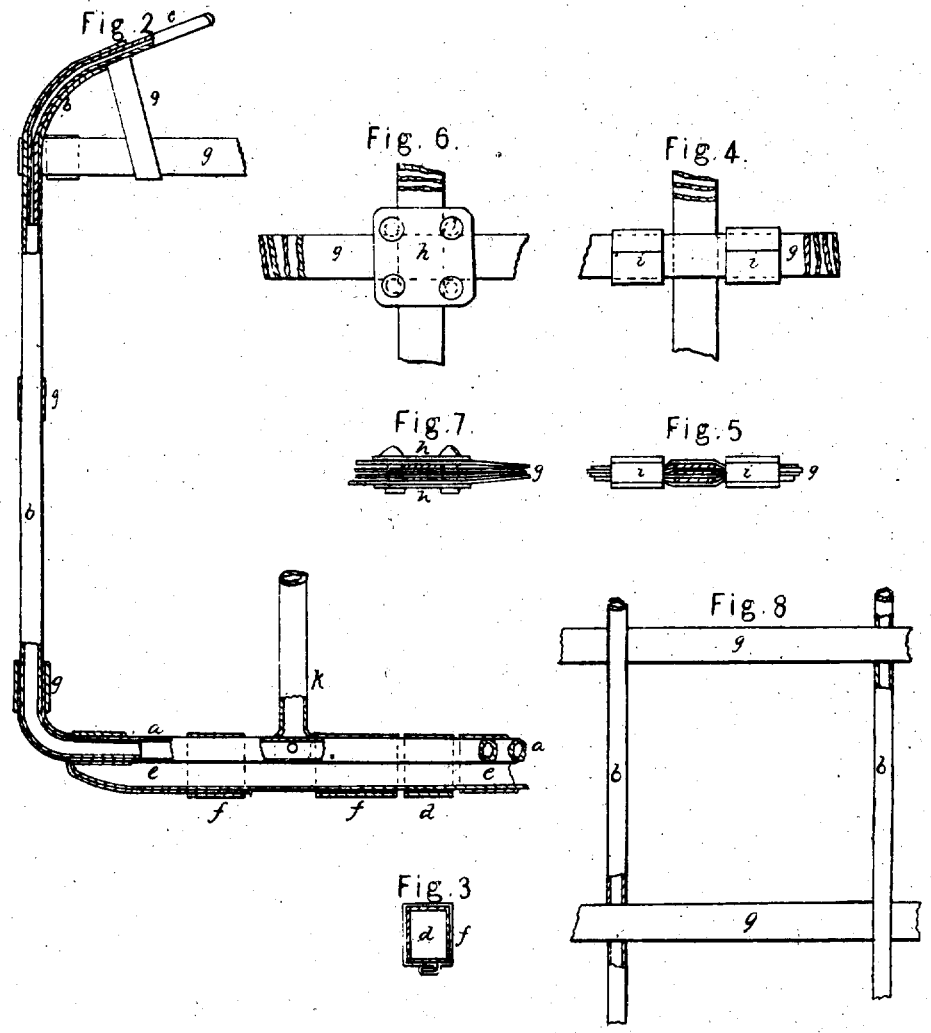
Witnesses:
S. Burnham
Wm Kimble Hall
Inventor:
B. J. La Mothe

UNITED STATES PATENT OFFICE.

B. J. LA MOTHE, OF NEW YORK, N. Y., ASSIGNOR TO LA MOTHE LIFE PRESERVING IRON CAR COMPANY, OF SAME PLACE.

IMPROVEMENT IN METALLIC CARS FOR RAILROADS.

Specification forming part of Letters Patent No. 33,350, dated September 24, 1861; Reissue No. 1,364, dated December 16, 1862.

*To all whom it may concern:*

Be it known that I, BERNARD J. LA MOTHE, of the city, county, and State of New York, have invented certain new and useful Improvements in the Construction of Railroad-Cars and other Vehicles; and I do hereby declare that the following is a full, clear, and exact description of the same, reference being had to the accompanying drawings, making a part of this specification, and to the letters of reference marked thereon.

In cases of railroad accident more damage is generally occasioned by the splinters and broken ends of the wooden framing than by the mere shock and immediate effect of the collision. It has hence long been desirable to frame a car of wrought-iron or other ductile metal, in order to obviate this objection, and the systems of construction that have been hitherto adopted are somewhat analogous to the various methods of building iron bridges; but the cost and weight of the framing have been largely enhanced, and the latter feature not only involves expense for every mile of transportation, but also an increase of expenditure to a corresponding degree in the cost of maintenance of the road.

The value of hollow cylinders or tubes, where stiffness, lightness, and strength are required, is exemplified in bones, feathers, and reeds, and in nearly every branch of the natural kingdoms. It would be impossible to devise a more perfect support for a heavily-filled head of wheat or rye than the light, strong, and elastic straw column upon which it has grown. The britannia bridge, over a branch of the sea in England, is a tube through which heavy locomotives with express-trains dash without the slightest dimunition of speed, and constitutes a magnificent example of the adaptation of nature's models for the purposes of mechanical construction and utility.

In works of ordinary and common application, however, like carriages for railroads and other purposes, the element of cost is as important for commercial profit as the perfection of the combination and arrangement of the parts are requisite to satisfy the problems of the mathematical engineer; and it is the necessity for thoroughly and cheaply connecting and fastening the various parts of tubular framing that has restricted the use of tubes to the office of mere stanchions and posts. Flanges are inadmissible, because they occupy too much room, and screw-couplings are equally objectionable on account of their cost, and they both, like all other connections and fastenings that have hitherto been employed, involve the cutting away of the metal of the tube in such a way that it necessarily impairs either its tensile strength or stiffness.

The object of my invention is to produce a cheap, light, and strong car that does not include within itself any elements of additional destruction to increase the horrors of an accident; and it consists in forming the framing of tubes, or of tubes and bands, combined in such a manner that the sides and top of the car form a complete truss in connection with the bottom, and contribute materially and largely to the strength of the structure and support of the load, instead of merely being a covering to a platform which carries all the weight and sustains all the strain, as is ordinarily the case. For this purpose I frame the parts of the transverse ribs together, so that each rib encircles the car, and the bottom, sides, and top pieces are continuations of each other and are heaviest in the bottom, where strength is required, and lightest at the top, where it is not so necessary; and the corners or angles of each rib, more particularly at the lower corners, where the sides and bottom frame together, are stronger than any other point, as is necessary to retain the shape of the section in the exigencies of practice. To attain this strength at the angles I use longer lengths of tubes than are necessary to extend across the bottom, or sides, or top, and I insert the end of one of the side tubes into the bottom tube and bend the two together to form the corner, and in a similar manner I insert the end of the roof-tube into the upper end of the side tube and bend them to form the upper corner. The tubes may be readily bent as described, and if it should be considered desirable to furnish additional strength to the corners it may be accomplished by the insertion of an additional short length of tube or a piece of rod, and with a mold or form prepared for the purpose a perfect uniformity of all the ribs may be easily insured. In a similar manner continuous ribs may be made to encircle the car in the direction of its length, and the same method of combination is applicable to door and other frames.

Instead of using longitudinal ribs of tubes, I sometimes prefer to tie the transverse ribs together with continuous bands which pass on each side or over and under the transverse ribs, and hold them securely in the position in which they are originally set up by means of clamps or sleeves that fit loosely over the pair of bars midway between the ribs, and are driven up toward the ribs and bind the bars or hoops forcibly upon them. Tubes may be held together in the same manner at the point of intersection, and they may have their sides slightly indented at the point of contact. In this manner neither tubes nor bars are weakened by perforations for the reception of rivets. The longitudinal tubes or series of tubes in the bottom may be replaced with wooden beams, when it is not considered objectionable to employ them, and these beams should have recesses cut for the reception of the transverse ribs and be covered or bound on one or more sides with continuous bands, which are clamped upon and around the beam in any suitable manner.

To enable others skilled in the art to make and use my invention, I will proceed to describe its construction and operation, with reference to the drawings.

Figure 1 is a side elevation of a portion of a car constructed according to my invention, and represented with part of the covering removed for the purpose of showing the framing; and Fig. 2 is an end view of the same. Fig. 3 is a section of a wooden floor-beam incased with metallic bars or strips that are retained by means of a sleeve-clamp. Figs. 4 and 5 are views at the point of intersection of a series of bars, illustrating the manner in which they are secured together by the sleeve previously described. Figs. 6 and 7 is another manner of clamping intersecting bars or tubes together without weakening the parts, as would otherwise be the case by perforating them with holes. It consists of a pair of plates conforming to the surfaces of the bars or tubes, and riveted or bolted together over the intersections by rivets or bolts that pass close in the angle and retain it in its original shape. Fig. 8 illustrates a method of passing the longitudinal bars through the tubes of the transverse ribs. These longitudinal bars or tubes may pass either inside or outside or on both sides the tubes of the transverse ribs.

The bottom, side, and top tubes, *a*, *b*, and *c*, of the transverse ribs are inserted one into the other at the corners in the manner described, and are connected with the flat bars *g* or horizontal tubes by the sleeve-sockets *i*. The bottom beams or tubes, *d* and *e*, are secured in a similar manner with the sleeves *f*. A part of one of the door-frames is represented at *k*.

Having thus described the methods of construction which I prefer to adopt, I would here remark that I do not confine myself to the precise arrangement and details hereinbefore specified; but that the framing may be made either for passenger, freight, or platform cars, in any suitable manner that admits the essential features of my invention.

I claim as my invention and desire to secure by Letters Patent to the LA MOTHE LIFE PRESERVING IRON CAR COMPANY.

1. The construction of the frames of railroad-cars and other vehicles of tubes, or of tubes and bars combined, substantially in the manner described.

2. Connecting the separate tubes of which the ribs are composed, and strengthening the corners by inserting the tubes within each other, or by the insertion of additional tubes or rods, as specified.

3. Clamping the intersections by means of the sleeve-sockets *i*, fitting loosely over the bars or tubes midway between the ribs, and driving tightly against them.

4. The pair of riveted or bolted clamps *h*, Figs. 6 and 7, securing the intersecting bars or tubes without perforating the latter with holes.

B. J. LA MOTHE.

Witnesses:
I. BURNHAM,
WM. KEMBLE HALL.